United States Patent [19]

Yamamoto et al.

[11] Patent Number: 5,065,177
[45] Date of Patent: Nov. 12, 1991

[54] SLR CAMERA WITH AUXILIARY LIGHT EMITTER

[75] Inventors: Masato Yamamoto; Masahiro Nakajima; Toshimasa Yamanaka, all of Tokyo, Japan

[73] Assignee: Asahi Kogaku Kogyo K.K., Tokyo, Japan

[21] Appl. No.: 549,663

[22] Filed: Jul. 9, 1990

Related U.S. Application Data

[63] Continuation of Ser. No. 414,750, Sep. 27, 1989, abandoned, which is a continuation of Ser. No. 291,016, Dec. 28, 1988, abandoned.

[30] Foreign Application Priority Data

Dec. 28, 1987 [JP] Japan .............................. 62-198848[U]

[51] Int. Cl.$^5$ .......................... G03B 3/00; G03B 15/05
[52] U.S. Cl. .................................. 354/403; 354/149.1; 354/149.11
[58] Field of Search ...................... 354/403, 126, 145.1, 354/149.1, 149.11

[56] References Cited

U.S. PATENT DOCUMENTS

| | | | |
|---|---|---|---|
| 4,690,538 | 9/1987 | Matsui et al. | 354/403 |
| 4,771,308 | 9/1988 | Tejima et al. | 354/403 |
| 4,870,442 | 9/1989 | Tejima et al. | 354/403 |
| 4,893,140 | 1/1990 | Yamamoto et al. | 354/149.11 |
| 4,910,542 | 3/1990 | Yamamoto et al. | 354/149.11 |
| 4,920,368 | 4/1990 | Arai et al. | 354/145.1 |

FOREIGN PATENT DOCUMENTS

| | | |
|---|---|---|
| 3212830 | 6/1983 | Fed. Rep. of Germany . |
| 3639751 | 5/1987 | Fed. Rep. of Germany . |

Primary Examiner—A. A. Mathews
Attorney, Agent, or Firm—Sughrue, Mion, Zinn, Macpeak & Seas

[57] ABSTRACT

A pop-up flash unit 20 for an SLR camera includes an integral auxiliary light emitting device 26 for projecting a predetermined pattern along the camera lens axis to provide sufficient auto-focusing contrast. A triangular prism 60 forms a window in a front wall 16a of the flash unit chamber 16 confronting the condenser lens 25 of the auxiliary light emitting device such that the predetermined pattern projected by the downwardly angled emitting device, when the flash unit is retracted, is bent upwardly to still fall along the camera lens axis.

5 Claims, 4 Drawing Sheets

SLR CAMERA WITH AUXILIARY LIGHT EMITTER

This is a continuation application of patent application Ser. No. 07/414,750, filed on Sept. 27, 1989, which is a continuation of Ser. No. 07/291,016, filed Dec. 28, 1988, both now abandoned.

BACKGROUND OF THE INVENTION

This invention relates to a single-lens reflex camera having an automatic focus control device and a flash device, and more particularly to an auxiliary light emitting device for such a camera which, when an object to be photographed is low in brightness or in contrast, establishes an adequate focusing contrast for the object.

Recently, single-lens reflex cameras have been markedly automated, and a variety of such cameras with an automatic focus control and a built-in flash have been proposed.

The automatic focus control in many of these cameras employs systems which detect focusing condition of an objective lens based on the light which has passed through the objective lens. For example, when the object is dark or low in contrast, such as a white wall, the output is insufficient, and the lens cannot be accurately focused. In order to overcome this difficulty, an auxiliary light emitting unit for projecting a pattern of light and dark stripes towards the object has been employed. That is, when the object is dark or low in contrast, the striped pattern projecting unit is operated to project the striped pattern towards the object so that a contrast necessary for the focusing operation is obtained.

A single-lens reflex camera having the above-described function is shown in FIGS. 6 through 8, wherein FIG. 6 is a perspective view showing the essential components of a built-in flash unit, and FIGS. 7 and 8 are sectional diagrams taken along the optical axis of the camera showing the essential parts of a pop-up mechanism of the flash unit.

A penta housing 12 is mounted on the camera body 10, and a penta prism 14 is disposed in the housing. A chamber 16 for accommodating a flash unit casing 20 is provided in front of the upper portion of the penta prism 14. The casing has a top plate 27 which, when the casing is retracted in the chamber 16, defines the closed external appearance of the camera together with the penta housing 12.

The casing 20 is made up of a first chamber 21a and a second chamber 21b. A flash F is provided in the first chamber 21a, and an auxiliary light emitting device S is provided in the second chamber 21b. More specifically, a Fresnel lens 22 is provided on the front end of the first chamber 21a, and a xenon tube (light emitting element) 23 and a reflecting mirror 24 are arranged behind the Fresnel lens. The second chamber has a condenser lens 25 on its front end, and a striped pattern projecting unit 26 for generating a striped (dark and light) pattern behind the condenser lens 25. The condenser lens 25 is integral with the Fresnel lens 22.

The casing 20 is mounted in the chamber 16 of the camera body through a conventional pop-up mechanism such that it is movable between an extended or raised position and a retracted position.

Referring to FIGS. 7 and 8, right and left pop-up mechanisms are provided between the right and left side plates 28 of the casing 20 and the side walls of the chamber 16. Since the right and left pop-up mechanisms are equal in construction, only one of them will be described. The side plate 28 has two holes 28a and 28b into which shafts 34 and 40 are inserted. A first lever 32 and a second lever 38 are rotatably mounted on the shafts 34 and 40. The other ends of the levers are coupled through shafts 36 and 42 to the penta housing 12 in the chamber 16, thus forming a quadric crank chain pop-up mechanism for the casing 20. The first lever 32 is U-shaped, and is supported by the shaft 36 at the elbow. A torsion spring (not shown) is coupled to the shaft 42 of the second lever 38 to urge it counterclockwise in the figure; i.e. obliquely upward toward the extended position.

The shaft 42 is coupled to a locking lever 50, with which one end of the torsion spring mentioned above is engaged, so that the locking lever 50 is urged counterclockwise. The range of swing of the locking lever 50 is regulated; that is, the swinging of the locking lever 50 is stopped when a part of it strikes against the inner wall of the chamber 16. When the casing is retracted, the end of the locking lever 50 is engaged with the locking surface 32a of the first lever 32 to prevent the counterclockwise swing of the first lever. As a result, the movement of the casing 20 to the extended position by the torsion spring is prevented; that is, the casing is held in the retracted position.

The locking lever 50 is disengaged from the locking surface 32a by displacing it in a direction perpendicular to the drawing with a disengaging member (not shown) mounted on the side wall of the penta housing 12. Accordingly, when the casing 20 is moved to the extended position by means of the disengaging member, the flash F and the auxiliary light emitting device S are exposed simultaneously. Under this condition, the preparatory operations for light emission by the xenon tube 23 and for the projection of the striped pattern by the projecting unit 26 are accomplished.

When the photographer depresses the release button on the camera body 10, in the initial stage the striped pattern projecting unit 26 is electrically energized to generate a striped pattern. In the camera body 10, according to the contrast of the object with the striped pattern, the object's position is detected, and according to the position detection signal the lens is driven to a focused position. When the release button is further depressed the shutter is released; that is, the mirror is raised, the shutter curtain is run and the xenon tube 23 emits light.

If the striped pattern is oriented in a direction perpendicular to the optical axis of the camera, the range of distance in which the striped pattern image is clearly formed would be limited to a considerably small value. In view of this difficulty the present applicant has proposed, as described in U.S. Pat. No. 4,771,308, that, as shown in FIG. 5, a striped pattern A-B and a condenser lens 25 are so arranged that a prolongation of the striped pattern and a straight line which intersects the optical center of a condenser lens 25 and is perpendicular to the optical axis OS of the condenser lens meet at one point 01 on the optical axis OL of the camera lens L. With this arrangement, as shown in FIGS. 4A and 5, the striped pattern image is formed as a striped pattern a-b along the optical axis OL of the camera lens L. That is, the striped pattern a-b is clearly formed on objects lying along the optical axis OL, which allows an accurate and quick focusing operation.

Sometimes it is necessary to photograph a dark object without using the flash, and even if an object is light enough to render the flash unnecessary, its contrast may be low. In order to photograph such objects, it is necessary to use auxiliary light emitting means. It is unnecessary to use the flash unit, however, and therefore it is desirable that only the auxiliary light emitting device S be caused to emit light with the flash unit held retracted.

However, even if, in the above-described conventional structure, the front wall 16a of the chamber 16 is made of a transparent plate, the optical axis OS of the auxiliary light emitting device S is directed excessively downwardly in the retracted position, and therefore the image of the striped pattern A-B is formed as a striped pattern a1-b1 well below the optical axis OL of the camera lens (cf. FIG. 4B), which is so far away from the automatic focusing range that it is of no use.

SUMMARY OF THE INVENTION

In view of the foregoing, an object of this invention is to provide an auxiliary light emitting device for an automatic focusing single-lens reflex camera having a flash device with an auxiliary light emitting unit, which can perform auxiliary light emission not only when the flash unit is in a raised position but also when it is in a retracted position.

The foregoing object has been achieved by the provision of a triangular prism in a window region of the front wall of the flash unit chamber, in front of the auxiliary light emitting unit condenser lens, so that, with the flash unit in the retracted position, the projection of a striped pattern image conjugate with the striped pattern is bent upwardly and thus formed along the optical axis of the camera lens.

DETAILED DESCRIPTION OF THE PREFERRED EMBODIMENT

Figure 6:
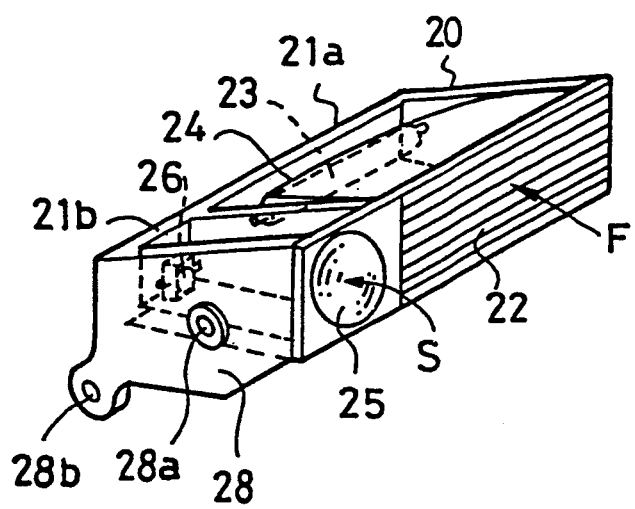
FIG. 6 is a perspective view showing the essential components of the light emitting sections in the built-in flash.
Figure 7:
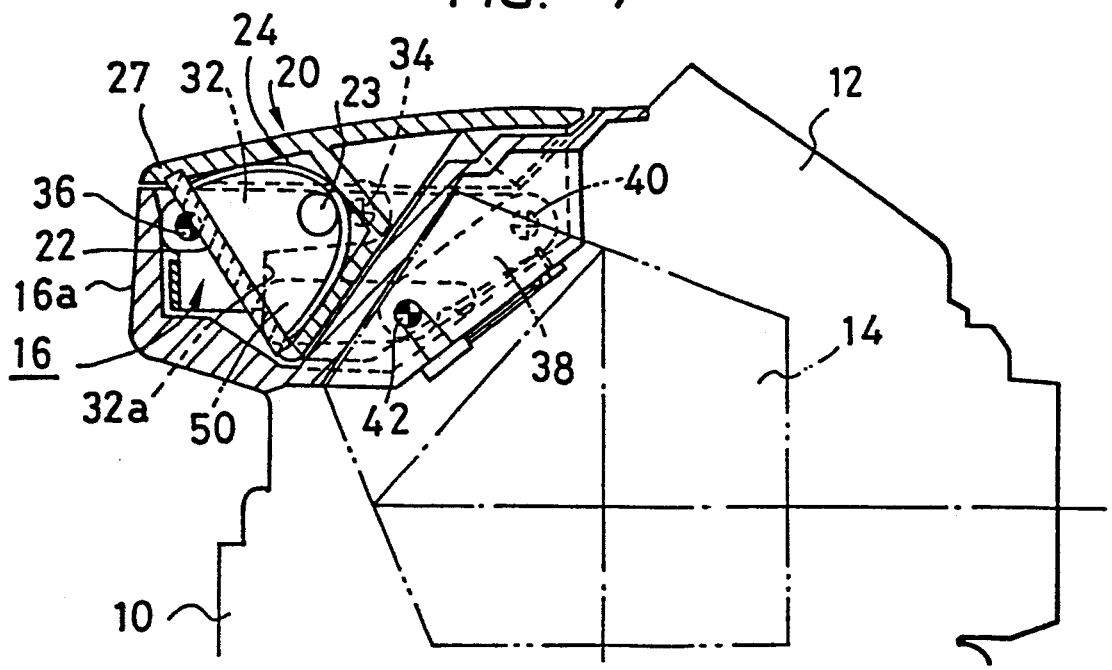
FIGS. 7 and 8 are sectional views taken along the optical axis of a single-lens reflex camera, showing its flash unit in retracted and raised positions, respectively.
Figure 8:
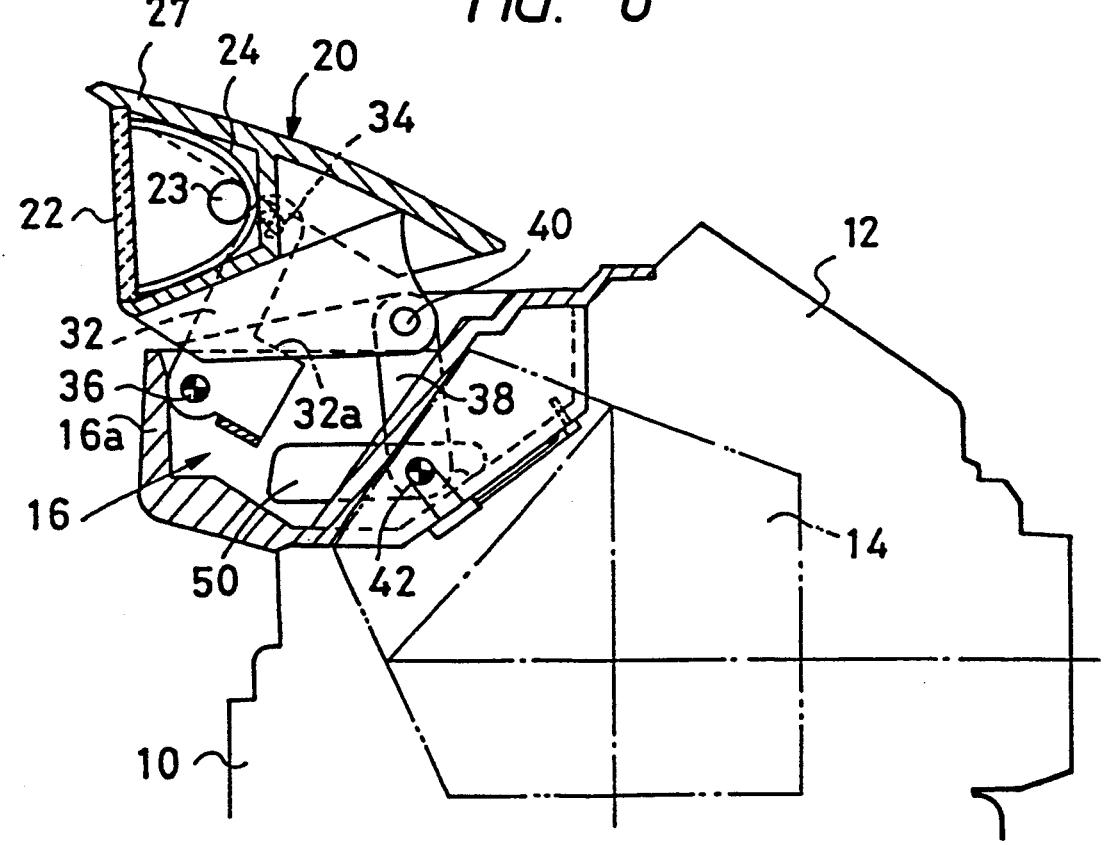

An embodiment of the invention will be described with reference to FIGS. 1 through 5, wherein parts corresponding functionally to those already described with reference to FIGS. 6 through 8 are designated by the same reference numerals or characters, and the preceding description is applicable.

Figure 4A:
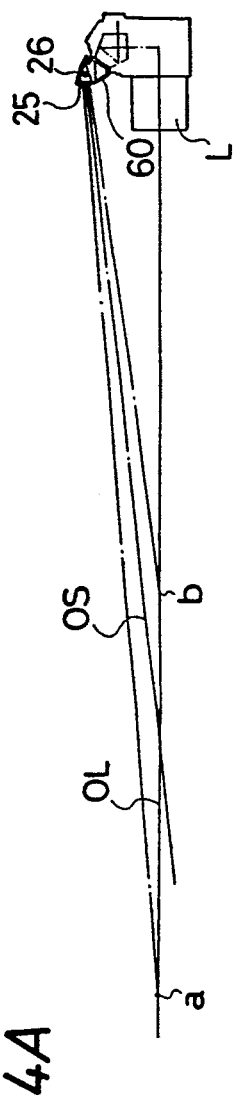
FIGS. 4A, 4B and 5 are explanatory diagrams indicating the positions of a striped pattern image formed by the auxiliary light emitting device with respect to the optical axis.
Figure 4B:
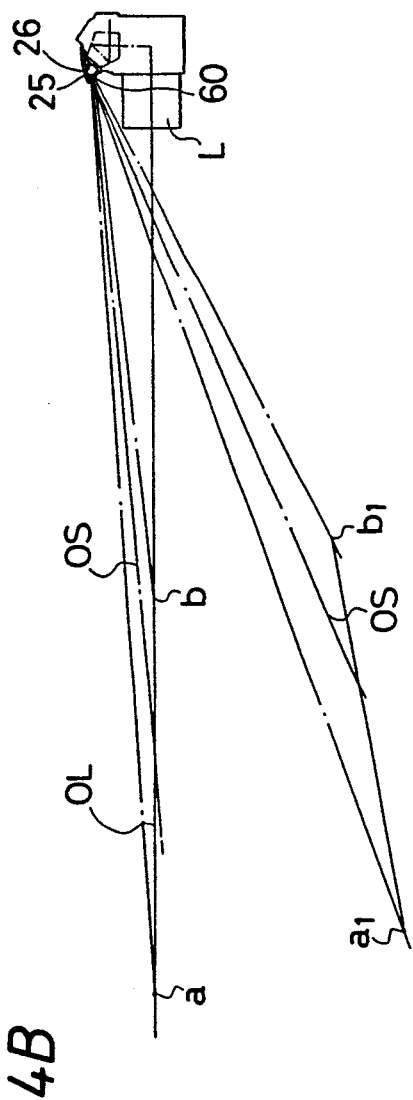
Figure 5:

As before, the condenser lens 25 and the striped pattern projecting unit 26 are so arranged that, with the flash unit raised or popped out, the prolongation of the striped pattern A-B and the straight line which intercepts the optical center of the condenser lens 25 and is perpendicular to the optical axis OS of the condenser lens meet at the point 01 on the optical axis OL of the camera lens L. With this arrangement, as shown in FIGS. 4A and 5, the striped pattern A-B is formed as a striped pattern image a-b along the optical axis OL of the camera lens L. That is, the striped pattern image is clearly formed on objects lying along the optical axis OL.

In accordance with the invention, the front wall 16a of the chamber 16, which faces the condenser lens 25 of the auxiliary light emitting device S, has a window opening in which a triangular prism 60 is fitted. The prism is positioned with its thicker portion up so that a light beam incident thereon is refracted upwardly. Therefore, the striped pattern projected by the striped pattern projecting unit 26, when the flash unit is retracted, is refracted or bent upwardly when passing through the triangular prism 60, thus forming a striped pattern image a-b along the optical axis OL of the photographing lens L as shown in the upper portion of FIG. 4B.

Figure 1:
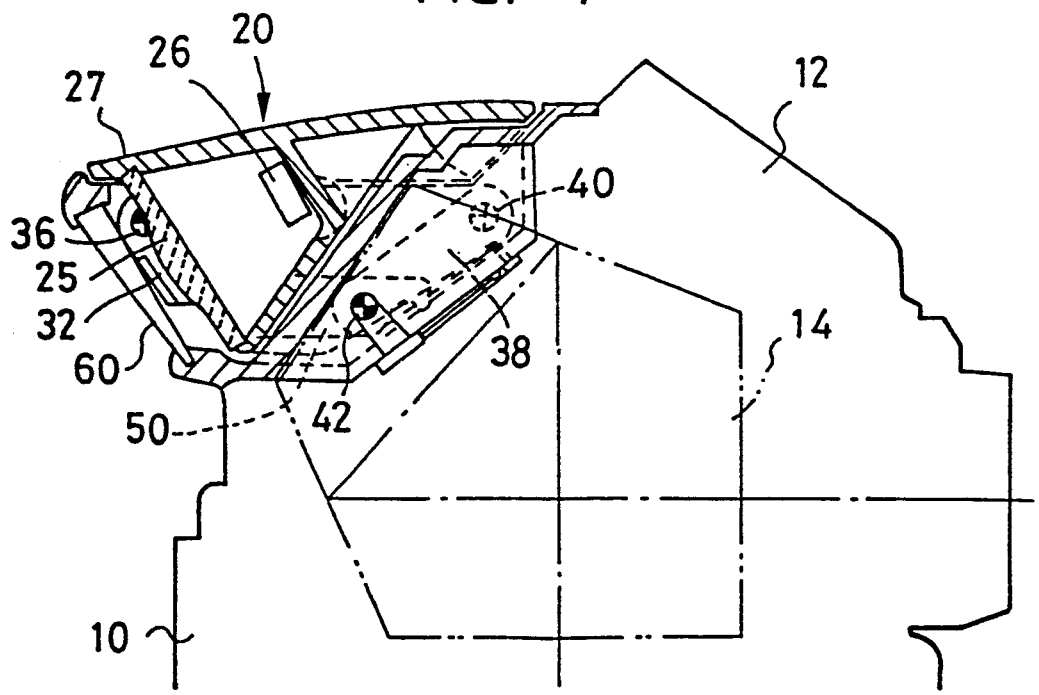
FIGS. 1 and 2 are vertical sectional views taken along the optical axis of a single-lens reflex camera with a built-in flash and an auxiliary light emitting device in accordance with the invention, in retracted and raised positions, respectively.
Figure 2:
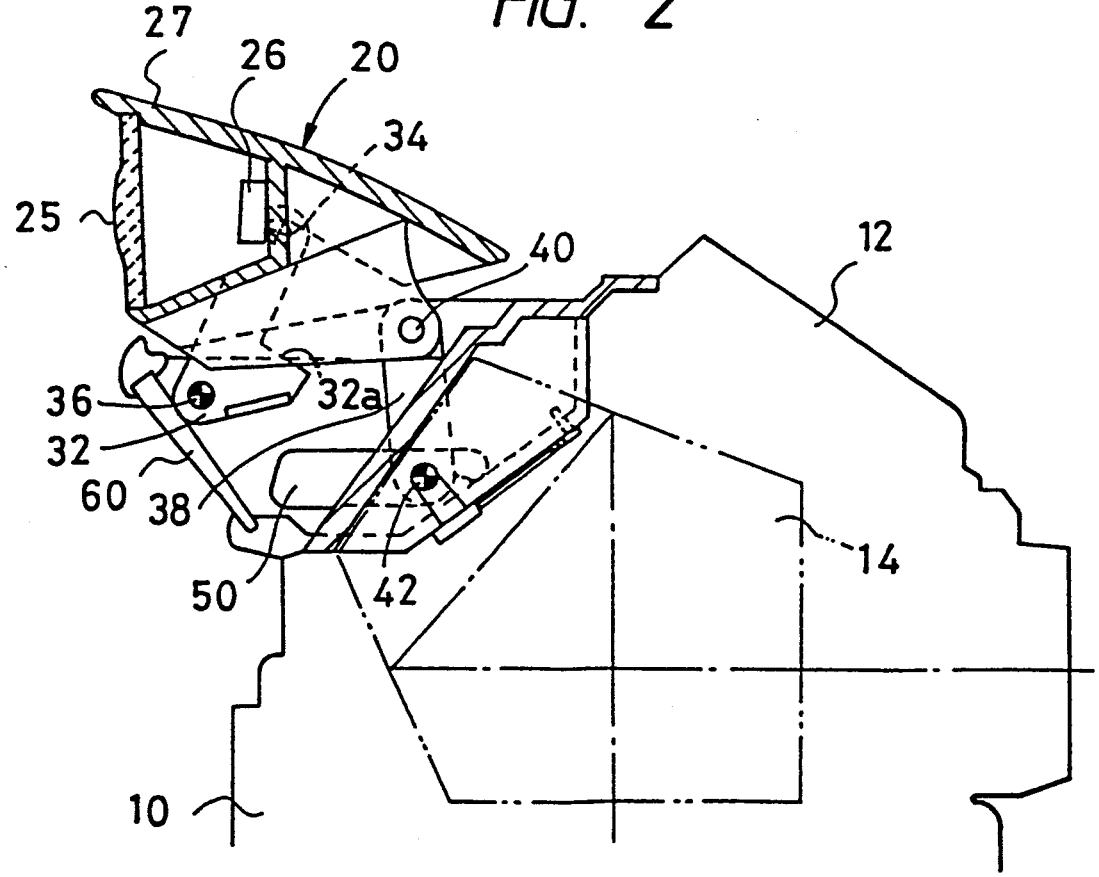
Figure 3:
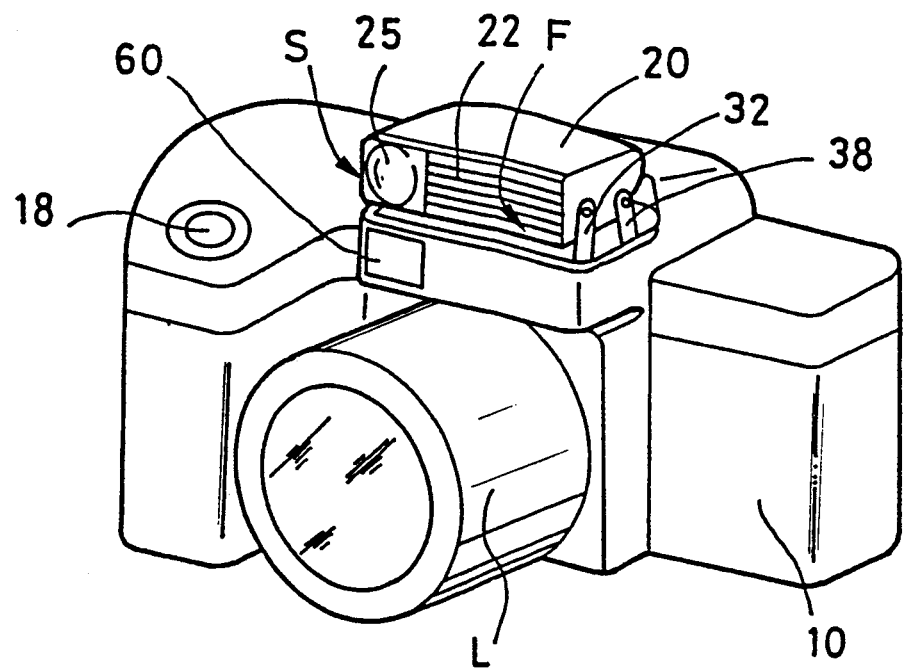
FIG. 3 is a perspective view of the camera in accordance with the invention.

In operation, when the casing 20 is moved to the raised position by operating the release member, the flash F and the integral auxiliary light emitting device S are simultaneously exposed as shown in FIG. 2. This enables light emission by the xenon tube 23 in the built-in flash, and the projection of the striped pattern by the unit 26.

When the photographer initially depresses the release button 18 on the camera body 10, the striped pattern projecting unit 26 is electrically energized, the pattern A-B is projected, and the striped pattern image a-b is formed along the axis OL. Then, in the electronics of the camera body 10, and in a manner known per se, the object position is detected from its contrast with the striped pattern image a-b, and according to the position detection signal, the lens is motor driven to the focused position.

When the release button 18 is further depressed, the shutter is released, the mirror is raised, the shutter curtain is run, and the xenon flash tube 23 is energized.

In accordance with the invention, even when the casing 20 is retracted, the striped pattern projecting unit 26 can be activated. When the casing is retracted into the chamber 16 and held therein, the condenser lens 25 confronts the triangular prism 60. When, in this position, the striped pattern projecting unit 26 is activated, the outputted striped pattern A-B is deflected upwardly when passing through the prism to form the striped pattern image a-b along the camera lens optical axis OL. Thus, the striped pattern image a-b is formed substantially at the same axial position as it is formed with the flash unit casing raised, which enables automatic focusing with the flash unit retracted and without any flash energization.

When the casing 20 is retracted, the striped pattern projecting unit 26 may be selectively activated with a switch operated by the photographer, or it may be automatically activated by a control circuit when the focusing device detects a low object contrast.

What is claimed is:

1. An auxiliary light emitting device for a single-lens reflex camera which includes an automatic focus control device for detecting the focusing condition of an object to be photographed, comprising: a flash unit (20) mounted to a body of said camera and selectively movable between a retracted position with said body and raised position, a predetermined pattern projecting unit (26) disposed adjacent to a light emitting section of said flash unit and unitary with said flash unit for projecting a predetrmined pattern towards said object, and bending means for bending a pattern projected by said projecting unit upwardly when said flash unit is in said retracted position such that an image of said predetrmined pattern is formed along an optical axis of a camera lens to provide sufficient contrast for automatic focusing.

2. An auxiliary light emitting device as claimed in claim 1, wherein said predetermined pattern projecting unit includes means for projecting a predetermined pattern and a condenser lens disposed in front of said means for forming an image of said predetermined pattern.

3. An auxiliary light emitting device as claimed in claim 2, wherein said bending means comprises a triangular prism.

4. An auxiliary light emitting device as claimed in claim 2, wherein, with said flash unit in said raised position, a straight line which intersects an optical center of said condenser lens and is perpendicular to the optical axis of said projecting unit, and a prolongation of a plane of said predetermined pattern, meet at a point on the optical axis of said camera lens.

5. An auxiliary light emitting device as claimed in claim 3, wherein said flash unit is accommodated in a chamber (16) of the camera body in the retracted position, and the prism is mounted in a window opening of a front wall (16a) of said chamber.

* * * * *